(12) United States Patent
Dou et al.

(10) Patent No.: US 11,886,068 B2
(45) Date of Patent: Jan. 30, 2024

(54) VIEWING ANGLE DIFFUSION FILM AND DISPLAY PANEL

(71) Applicant: TCL CHINA STAR OPTOELECTRONICS TECHNOLOGY CO., LTD., Shenzhen (CN)

(72) Inventors: Hu Dou, Shenzhen (CN); Ziping Wu, Shenzhen (CN); Gang Yu, Shenzhen (CN)

( * ) Notice: Subject to any disclaimer, the term of this patent is extended or adjusted under 35 U.S.C. 154(b) by 668 days.

(21) Appl. No.: 17/040,995

(22) PCT Filed: Aug. 3, 2020

(86) PCT No.: PCT/CN2020/106543
§ 371 (c)(1),
(2) Date: Sep. 24, 2020

(87) PCT Pub. No.: WO2022/000689
PCT Pub. Date: Jan. 6, 2022

(65) Prior Publication Data
US 2023/0104693 A1    Apr. 6, 2023

(30) Foreign Application Priority Data
Jul. 2, 2020 (CN) .......................... 202010627883.4

(51) Int. Cl.
*G02F 1/1335* (2006.01)
*G02B 5/02* (2006.01)

(52) U.S. Cl.
CPC ..... *G02F 1/133507* (2021.01); *G02B 5/0263* (2013.01); *G02F 1/133531* (2021.01); *G02F 2201/50* (2013.01)

(58) Field of Classification Search
None
See application file for complete search history.

(56) References Cited

U.S. PATENT DOCUMENTS

| 2012/0182506 | A1 | 7/2012 | Park et al. |
| 2015/0219957 | A1 | 8/2015 | Kamada et al. |
| 2019/0086712 | A1 | 3/2019 | Ki et al. |
| 2019/0324328 | A1 | 10/2019 | Chen et al. |
| 2020/0251535 | A1 | 8/2020 | Fan et al. |
| 2020/0285100 | A1 | 9/2020 | Xu et al. |

FOREIGN PATENT DOCUMENTS

| CN | 200959037 | Y | | 10/2007 |
| CN | 101815965 | A | | 8/2010 |
| CN | 101606020 | | * | 4/2011 |
| CN | 202256737 | U | | 5/2012 |
| CN | 102590897 | A | | 7/2012 |
| CN | 103185907 | A | | 7/2013 |
| CN | 104641283 | A | | 5/2015 |
| CN | 106415376 | A | | 2/2017 |
| CN | 106773267 | A | | 5/2017 |
| CN | 108695359 | A | | 10/2018 |
| CN | 109828407 | A | | 5/2019 |
| CN | 110389475 | A | | 10/2019 |
| KR | 200451163 | | * | 11/2010 |

* cited by examiner

*Primary Examiner* — Ashok Patel

(57) ABSTRACT

A viewing angle diffusion film and a display panel are disclosed. The viewing angle diffusion film includes a substrate and a refractive protrusion disposed on a surface of the substrate. The refractive protrusion includes a first side surface away from a center of the substrate, and the first side surface includes a first curved surface.

18 Claims, 4 Drawing Sheets

VIEWING ANGLE DIFFUSION FILM AND DISPLAY PANEL

FIELD

The present disclosure relates to the field of display technologies, and more particularly, relates to a viewing angle diffusion film and a display panel.

BACKGROUND

Brightness performance of display panels with wide viewing angles becomes increasingly poor following improvement of resolution. Typically, in industry, a viewing angle diffusion film is disposed on display panels to make perpendicular light emitted from the display panels be spread at wider angles, thereby increasing display brightness viewed at wide angles.

However, conventional viewing angle diffusion films can only spread one incident light beam at one adjusting angle, limiting their capability to adjust incident light beams. In case of being used in display panels having relatively concentrated light beams, the viewing angle diffusion films perform poorly, which affects user experience.

Regarding the technical problem: in case of being used in display panels having relatively concentrated light beams, viewing angle diffusion films perform poorly, which affects user experience.

SUMMARY

In a first aspect, an embodiment of the present disclosure provides a viewing angle diffusion film, including a substrate and a refractive protrusion disposed on a surface of the substrate;
wherein the refractive protrusion includes a first lateral surface away from a center of the substrate, and the first lateral surface includes a first curved surface.

In some embodiments, the first curved surface extends from a top surface of the refractive protrusion to a bottom surface of the refractive protrusion.

In some embodiments, the first curved surface extends downward along a direction away from a center of the refractive protrusion.

In some embodiments, a top surface of the refractive protrusion includes a second curved surface.

In some embodiments, the viewing angle diffusion film further includes a protective layer covering the refractive protrusion, and a refractivity of the protective layer is greater than a reflectivity of the refractive protrusion.

In some embodiments, a top surface of the refractive protrusion includes an outer convex surface.

In some embodiments, the viewing angle diffusion film further includes a polarizing film disposed on a side of the substrate away from the refractive protrusion.

In some embodiments, the plurality of refractive protrusions are spaced apart from each other.

In some embodiments, the refractive protrusion is integrally formed with the substrate.

In a second aspect, the present disclosure further provides a display panel, including a display screen body and a viewing angle diffusion film, wherein the viewing angle diffusion film is disposed on a light-emitting side of the display screen body and includes a substrate and a refractive protrusion disposed on a surface of the substrate.

The refractive protrusion includes a first lateral surface away from a center of the substrate, and the first lateral surface includes a first curved surface.

In some embodiments, the first curved surface extends from a top surface of the refractive protrusion to a bottom surface of the refractive protrusion.

In some embodiments, the first curved surface extends downward along a direction away from a center of the refractive protrusion.

In some embodiments, a top surface of the refractive protrusion includes a second curved surface.

In some embodiments, the viewing angle diffusion film further includes a protective layer covering the refractive protrusion, and a refractivity of the protective layer is greater than a reflectivity of the refractive protrusion.

In some embodiments, a top surface of the refractive protrusion includes an outer convex surface.

In some embodiments, the viewing angle diffusion film further includes a polarizing film disposed on a side of the substrate away from the refractive protrusion.

In some embodiments, the plurality of refractive protrusions are spaced apart from each other.

In some embodiments, the refractive protrusion is integrally formed with the substrate.

In some embodiments, a width of a top surface of the refractive protrusion ranges from 3 μm to 10 μm.

In some embodiments, a width of a bottom surface of the refractive protrusion ranges from 12 μm to 20 μm.

Regarding the beneficial effects: when light beams emitted from a light source of a display panel are emitted on a refractive protrusion, because parallel light beams emitted on different positions of a curved surface results in different path directions of outgoing light beams, a viewing angle diffusion film can spread one incident light beam at multiple adjusting angles. Therefore, an adjusting capability of the viewing angle diffusion film is improved. In case of being used in display panels having relatively concentrated light beams emitted from light sources, the viewing angle diffusion film can spread light more widely, thereby enhancing quality of display images viewed at wide angles.

DESCRIPTION OF DRAWINGS

Technical solutions and beneficial effects of the present disclosure are illustrated below in detail in conjunction with drawings and specific embodiments.

DETAILED DESCRIPTION

Figure 1:
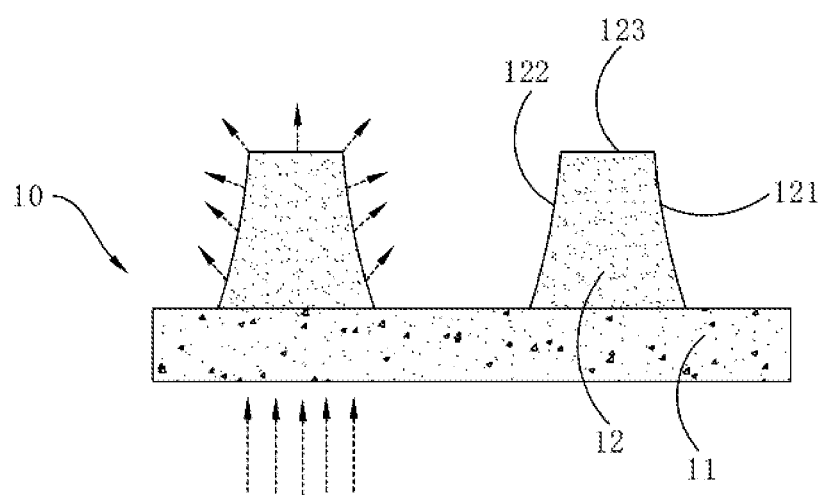
FIG. 1 is a first structural schematic view showing a viewing angle diffusion film according to the present disclosure.

The following description of the various embodiments is provided with reference to the accompanying drawings to demonstrate the embodiments of the present disclosure. It should be understood that terms such as "upper," "lower," "front," "rear," "left," "right," "inside," "outside," "lateral"

as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure. In the drawings, the identical or similar reference numerals constantly denote the identical or similar elements or elements having the identical or similar functions.

The present disclosure solves a following technical problem: viewing angle diffusion films perform poorly when used in display panels that have relatively concentrated light beams, which affects users' experiences.

As shown in FIG. 1, a viewing angle diffusion film 10 includes a substrate 11 and a refractive protrusion 12 disposed on a surface of the substrate 11. The refractive protrusion 12 is configured to change a path of light emitted on the viewing angle diffusion film 10, and allows a portion of light to be deflected along a direction away from a center of the viewing angle diffusion film 10 by refraction, thereby enhancing brightness viewed at wide angles.

The substrate 11 and the refractive protrusion 12 are made of a transparent material, thereby increasing light usage to a large extent. The refractive protrusion 12 is integrally formed with the substrate 11, thereby simplifying manufacturing procedures and reducing costs.

A width of a top surface 123 of the refractive protrusion 12 may range from 3 μm to 10 μm, a width of a bottom surface of the refractive protrusion 12 may range from 12 μm to 20 μm, and a height of the refractive protrusion 12 may range from 15 μm to 25 μm.

In one embodiment, the width of the top surface 123 of the refractive protrusion 12 may be 6 μm, the width of the bottom surface of the refractive protrusion 12 may be 18 μm, and the height of the refractive protrusion 12 may be 21 μm.

Specifically, the refractive protrusion 12 includes a first side surface 121 away from a center of the substrate 11, and the first side surface 121 includes a first curved surface.

It should be noted that when light beams emitted from a light source of a display panel are emitted on the refractive protrusion 12, because parallel light beams emitted on different positions of a curved surface result in different path directions of outgoing light beams, the viewing angle diffusion film 10 can spread one incident light beam at multiple adjusting angles. Therefore, adjusting capability of the viewing angle diffusion film 10 is improved. In case of being used in display panels having relatively concentrated light beams emitted from light sources, the viewing angle diffusion film 10 can spread light more widely, thereby enhancing quality of display images viewed at wide angles.

A radius of curvature of each position on the first curved surface is greater than or equal to 5 μm, and an absolute difference value between radiuses of curvature of positions on the first curved surface is less than or equal to 0.5.

It should be noted that the radius of curvature of each position on the first curved surface is designed to make a surface shape of the first curved surface smoother. Changes in angles between the positions on the first curved surface are slight, so that transmittance differences between the positions on the first curved surface are slight. Therefore, abnormal black lines and moire patterns will not appear.

Specifically, the first curved surface extends from the top surface 123 of the refractive protrusion 12 to the bottom surface of the refractive protrusion 12.

Furthermore, the first curved surface, the top surface 123 of the refractive protrusion 12, and the surface of the substrate 11 are connected, so that more positions on the first lateral surface 121 of the refractive protrusion 12 are curved surfaces. As a result, the viewing angle diffusion film 10 may have more adjusting angles for concentrated light beams.

Specifically, the first curved surface extends downward along a direction away from a center of the refractive protrusion 12.

It should be noted that when the viewing angle diffusion film 10 is attached to the display body 20, light entering the first curved surface of the viewing angle diffusion film 10 along a direction perpendicular to the surface of the substrate 11 is refracted by the first curved surface, and then is deflected along a direction away from the refractive protrusion 12, thereby increasing brightness viewed at wide angles.

It should be noted that FIG. 1 only shows a situation in which the first curved surface is an inner concave surface. In actual applications, the first curved surface may also be an outer convex surface. In addition, the first curved surface may also be formed from an inner concave surface and an outer convex surface which are connected to each other.

It should be noted that FIG. 1 only shows a situation in which the first curved surface only includes one curved surface. In actual applications, the first curved surface may also include multiple curved surfaces which are connected to each other. In addition, the first curved surface may also include multiple curved surfaces and inclined surfaces which are connected to each other.

Specifically, an entire vertical sectional shape of the first lateral surface 121 may be curved line-shaped, wavy line-shaped, jagged, or S-shaped.

Specifically, the refractive protrusion 12 further includes a second lateral surface 122 disposed opposite to the first lateral surface 121 and a third lateral surface disposed adjacent to the refractive protrusion 12. The shapes of the second lateral surface 122, the third lateral surface, and the first lateral surface 121 may be the same or different.

Specifically, an entire vertical sectional shape of the refractive protrusion 12 may be convex lens-shaped, concave lens-shaped, hourglass-shaped, or water drop-shaped.

Specifically, there are a plurality of refractive protrusions 12. The plurality of refractive protrusions 12 may be evenly or randomly distributed on the surface of the substrate 11, and the shapes of all refractive protrusions 12 may be the same or different.

In one embodiment, the plurality of refractive protrusions 12 are spaced apart from each other, thereby ensuring display brightness viewed in front of the display panel.

It should be noted that a distance between two adjacent refractive protrusions 12 may range from 2 μm to 25 μm, or may be determined according to actual situations. Typically, the more concentrated the light beams emitted from a light source of a display panel, the smaller the distance between two adjacent refractive protrusions 12.

In one embodiment, the distance between two adjacent refractive protrusions 12 may be 7 μm.

In one embodiment, the top surface 123 of the refractive protrusion 12 may be planar, thereby allowing a path of light, which is emitted on the refractive protrusion 12 along the direction perpendicular the surface of the substrate 11 and is emitted from the top surface 123 of the refractive protrusion 12, to remain unchanged. Therefore, display brightness viewed in front of the display panel can be ensured.

Figure 2:
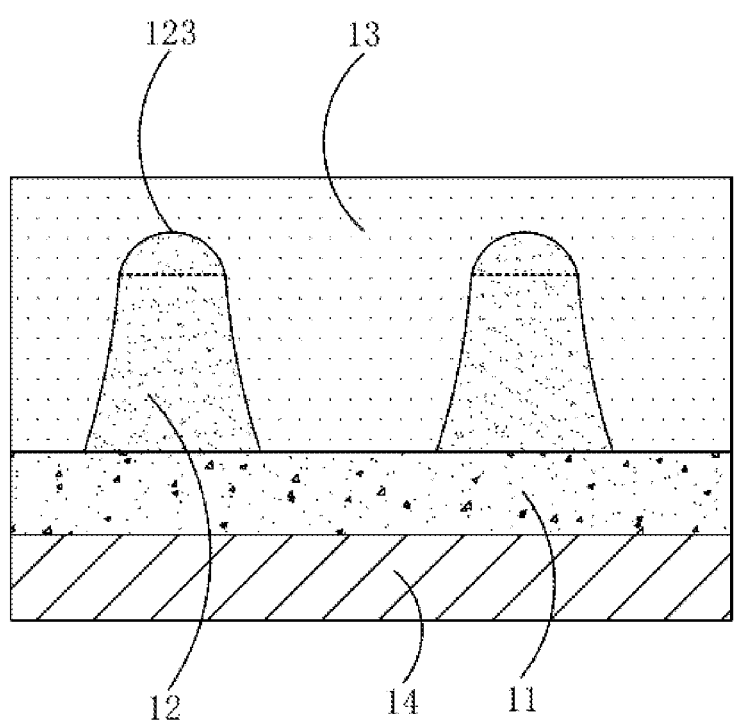
FIG. 2 is a second structural schematic view showing the viewing angle diffusion film according to the present disclosure.

As shown in FIG. 2, in another embodiment, the top surface 123 of the refractive protrusion 12 may further include a second curved surface, thereby allowing a path of light, which is emitted on the refractive protrusion 12 along the direction perpendicular to the surface of the substrate 11 and is emitted from the top surface 123 of the refractive protrusion 12, to be changed. As a result, relatively concentrated light beams can be spread over more regions, and display brightness uniformity of the display panel can be improved.

A radius of curvature of each position on the second curved surface is greater than or equal to 5 μm, and an absolute difference value between radiuses of curvature of positions on the second curved surface is less than or equal to 0.5.

It should be noted that the radius of curvature of each position on the second curved surface is designed to make a surface shape of the second curved surface smoother. Changes in angles between the positions on the second curved surface are slight, so that transmittance differences between the positions on the second curved surface are slight. Therefore, abnormal black lines and moire patterns will not appear.

It should be noted that when an arrangement of light sources of the display panel are relatively concentrated, the top surface 123 of the refractive protrusion 12 is generally a curved surface, and when an arrangement of light sources of the display panel are relatively sparse, the top surface 123 of the refractive protrusion 12 is generally a flat surface.

In one embodiment, the viewing angle diffusion film 10 further includes a protective layer 13 covering the refractive protrusion 12. The protective layer 13 is made of a transparent material and is configured to protect the refractive protrusion 12.

A refractivity of the protective layer 13 is greater than a refractivity of the refractive protrusion 12, thereby allowing light entering the protective layer 13 from the first lateral surface 121 of the refractive protrusion 12 to be deflected along the direction away from the refractive protrusion 12. As a result, brightness viewed at wide angles can be increased.

Furthermore, the top surface 123 of the refractive protrusion 12 includes an outer convex surface, thereby allowing light entering the protective layer 13 from the first lateral surface 121 of the refractive protrusion 12 to be deflected along the direction away from the refractive protrusion 12. As a result, brightness viewed at wider angles can be increased.

In one embodiment, the viewing angle diffusion film 10 further includes a polarizing film 14 disposed on a side of the substrate 11 away from the refractive protrusion 12.

It should be noted that by combining the refractive protrusion 12 and the polarizing film 14, the viewing angle diffusion film 10 can be regarded as a wide-viewing-angle polarizer and can replace a polarizer on conventional display panels.

Figure 3:
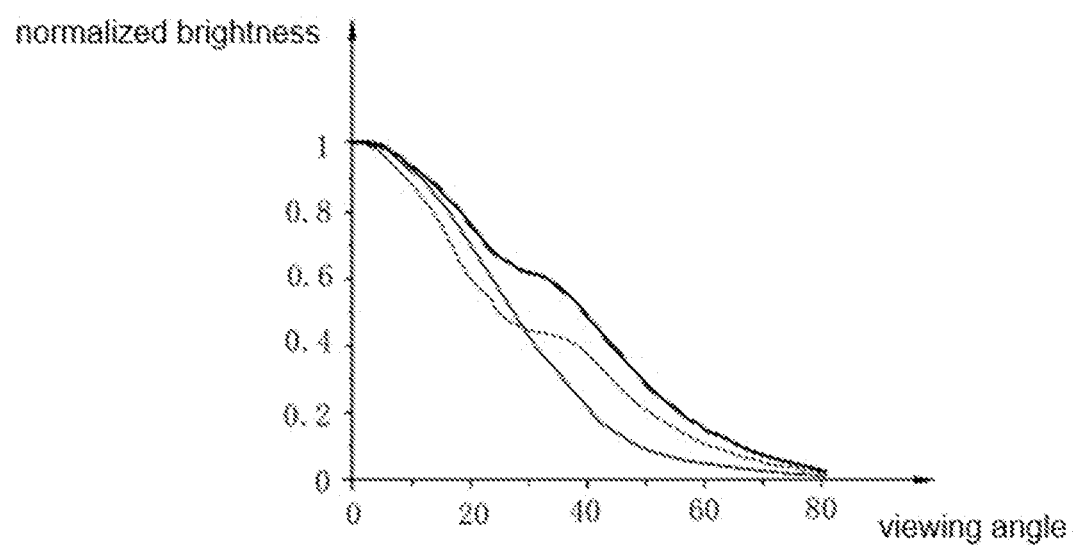
FIG. 3 is a curve diagram comparing normalized brightness between a conventional display panel and a display panel provided by the present disclosure in different viewing angles.

Please refer to FIG. 3, a curve diagram comparing normalized brightness between a conventional display panel and the display panel provided by the present disclosure viewed at different angles is provided.

Wherein, Y-axis corresponds to normalized brightness (display brightness of a display panel viewed at different angles), and X-axis corresponds to a viewing angle. A thick solid line corresponds to normalized brightness of the viewing angle diffusion film 10 of the display panel provided by the present disclosure viewed at different angles, a dotted line corresponds to normalized brightness of a viewing angle diffusion film of a conventional display panel viewed at different angles, and a thin solid line corresponds to normalized brightness of a display panel, which does not have a viewing angle diffusion film, viewed at different angles.

According to FIG. 3, under identical light source conditions, the viewing angle diffusion film 10 of the display panel provided by the present disclosure can provide improved brightness viewed at wide angles.

Figure 4:
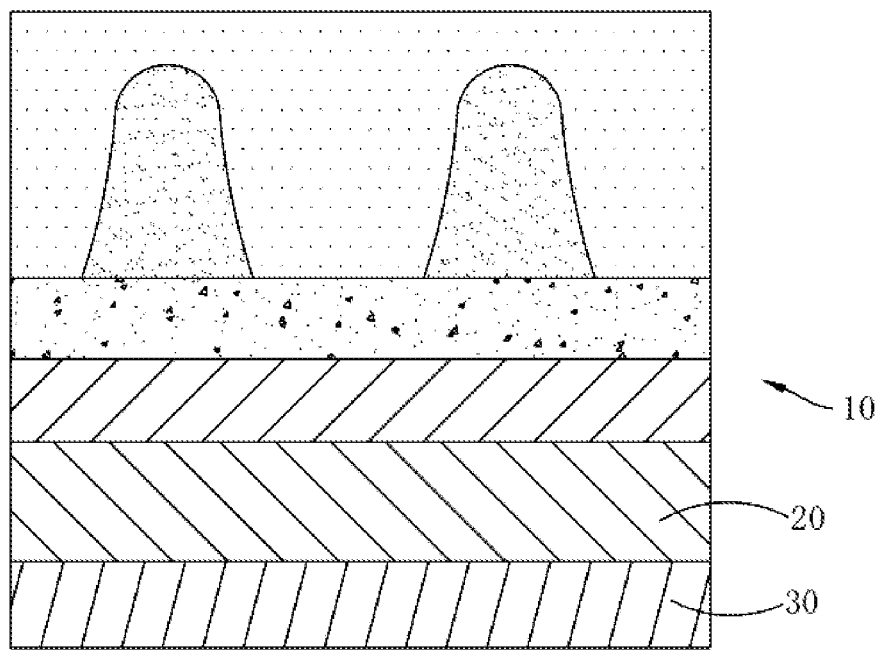
FIG. 4 is a structural schematic view showing a display panel according to one embodiment of the present disclosure.

Based on the above viewing angle diffusion film 10, the present disclosure further provides a display panel, as shown in FIG. 4. The display panel includes a display body 20 and the viewing angle diffusion film 10 described in any one of the above embodiments, and the viewing angle diffusion film 10 is disposed on a light-emitting side of the display body 20.

Specifically, the display panel further includes a backlight module 30 disposed on a side of the display body 20 away from the viewing angle diffusion film 10.

It should be noted that when the viewing angle diffusion film 10 is attached to the display body 20, the viewing angle diffusion film 10 can spread light. Therefore, it is not necessary to dispose a diffuser sheet on the backlight module 30, so manufacturing costs can be reduced.

Regarding the beneficial effects, when light beams emitted from a light source of a display panel are emitted on the refractive protrusion 12, because parallel light beams emitted on different positions of a curved surface results in different path directions of outgoing light beams, the viewing angle diffusion film 10 can spread one incident light beam at multiple adjusting angles. Therefore, an adjusting capability of the viewing angle diffusion film 10 is improved. In case of being used in display panels having relatively concentrated light beams emitted from light sources, the viewing angle diffusion film 10 can spread light more widely, thereby enhancing quality of display images viewed at wide angles.

In the above embodiments, the focus of each embodiment is different, and for a part that is not detailed in an embodiment, reference may be made to related descriptions of other embodiments.

The above embodiments specifically illustrate principles and implementations of the present disclosure. However, the description of the above embodiments is only for helping to understand the technical solution of the present disclosure and core ideas thereof, and it is understood by those skilled in the art that many changes and modifications to the described embodiment can be carried out without departing from the scope and the spirit of the disclosure that is intended to be limited only by the appended claims.

What is claimed is:

1. A viewing angle diffusion film, comprising a substrate, one or more refractive protrusions disposed on a surface of the substrate, and a protective layer covering the refractive protrusions,
   wherein each of the refractive protrusions comprises a first side surface away from a center of the substrate, and the first side surface comprises a first curved surface; and
   a refractivity of the protective layer is greater than a refractivity of each of the refractive protrusions.

2. The viewing angle diffusion film of claim 1, wherein the first curved surface extends from a top surface of the each of the refractive protrusions to a bottom surface of the each of the refractive protrusions, the bottom surface being in contact with the substrate, the top surface being away from the substrate and opposite to the bottom surface.

3. The viewing angle diffusion film of claim 2, wherein the first curved surface extends downward along a direction away from a center of the each of the refractive protrusions.

4. The viewing angle diffusion film of claim 1, wherein a top surface of each of the refractive protrusions comprises a second curved surface.

5. The viewing angle diffusion film of claim 1, wherein the refractive protrusions are integrally formed with the substrate.

6. The viewing angle diffusion film of claim 1, wherein a top surface of each of the refractive protrusions comprises an outer convex surface.

7. The viewing angle diffusion film of claim 1, wherein the viewing angle diffusion film further comprises a polarizing film disposed on a side of the substrate away from the refractive protrusions.

8. The viewing angle diffusion film of claim 1, wherein the one or more refractive protrusions comprise a plurality of refractive protrusions spaced apart from each other.

9. A display panel, comprising a display screen body and a viewing angle diffusion film, wherein the viewing angle diffusion film is disposed on a light-emitting side of the display screen body and comprises a substrate, one or more refractive protrusions disposed on a surface of the substrate, and a protective layer covering the refractive protrusions;
wherein each of the refractive protrusions comprises a first side surface away from a center of the substrate, and the first side surface comprises a first curved surface; and
wherein a refractivity of the protective layer is greater than a refractivity of each of the refractive protrusions.

10. The display panel of claim 9, wherein a width of a bottom surface of each of the refractive protrusions ranges from 12 µm to 20 µm.

11. The display panel of claim 9, wherein the first curved surface extends from a top surface of the each of the refractive protrusions to a bottom surface of the each of the refractive protrusions, the bottom surface being in contact with the substrate, the top surface being away from the substrate and opposite to the bottom surface.

12. The display panel of claim 11, wherein the first curved surface extends downward along a direction away from a center of the each of the refractive protrusions.

13. The display panel of claim 9, wherein a top surface of each of the refractive protrusions comprises a second curved surface.

14. The display panel of claim 9, wherein a width of a top surface of each of the refractive protrusions ranges from 3 µm to 10 µm.

15. The display panel of claim 9, wherein a top surface of each of the refractive protrusions comprises an outer convex surface.

16. The display panel of claim 9, wherein the viewing angle diffusion film further comprises a polarizing film disposed on a side of the substrate away from the refractive protrusions.

17. The display panel of claim 9, wherein the one or more refractive protrusions comprise a plurality of refractive protrusions spaced apart from each other.

18. The display panel of claim 9, wherein the refractive protrusions are integrally formed with the substrate.

* * * * *